May 24, 1960 K. O. LANGE ET AL 2,937,642
FRACTURE NAIL
Filed Feb. 17, 1956 2 Sheets-Sheet 1
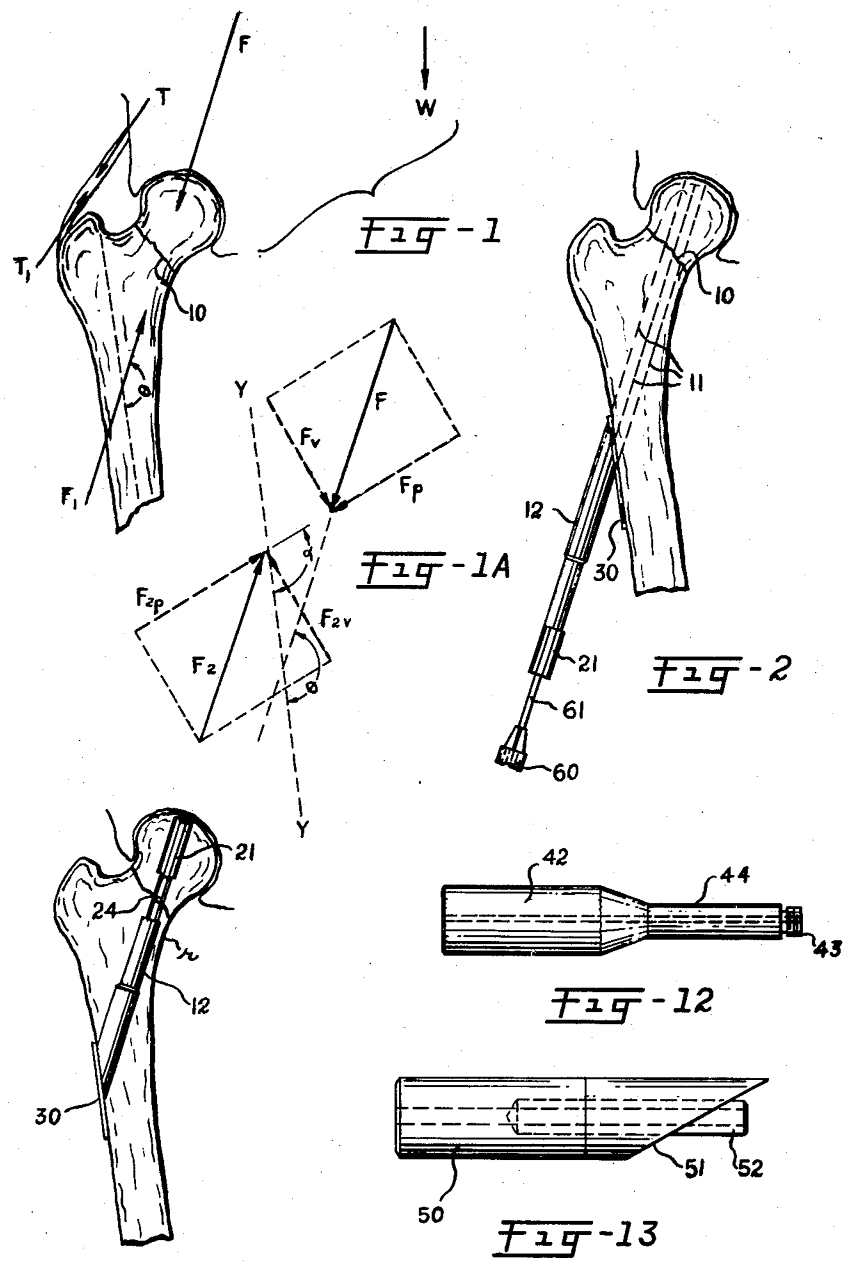
INVENTORS
KARL O. LANGE
WILLIAM K. MASSIE
BY
W. E. Sherwood
attorney May 24, 1960 K. O. LANGE ET AL 2,937,642
FRACTURE NAIL
Filed Feb. 17, 1956 2 Sheets-Sheet 2
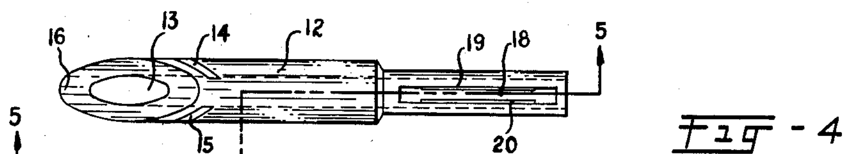
Fig - 4
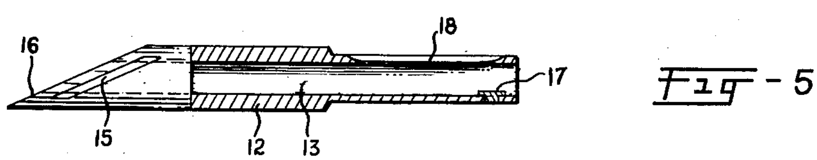
Fig - 5
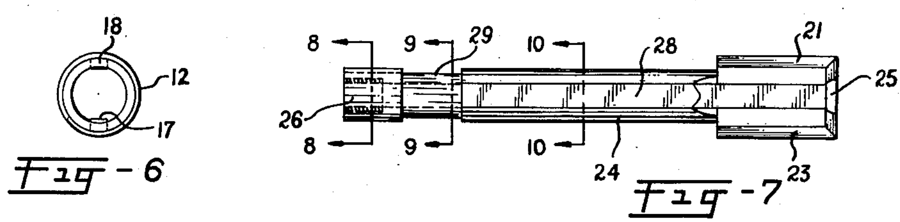
Fig - 6
Fig - 7
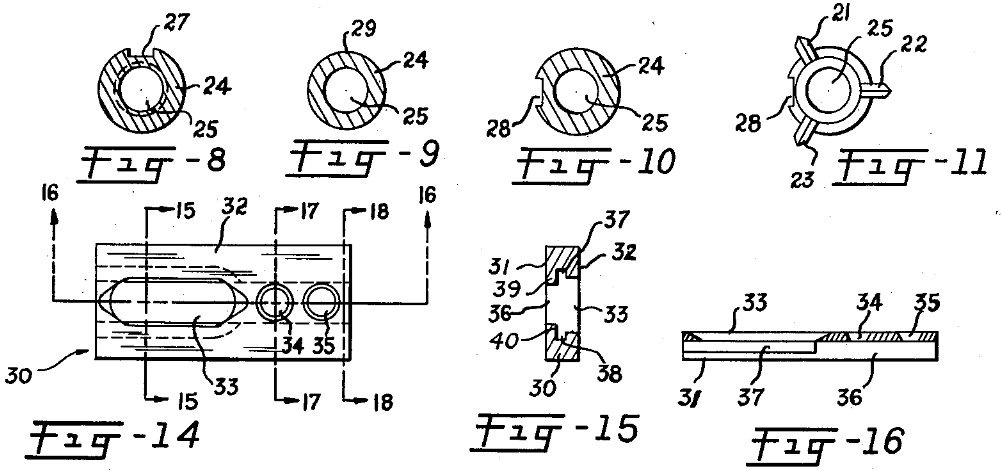
31
32
36
34
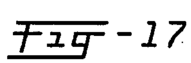
Fig - 17
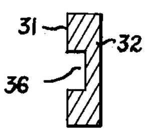
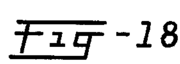
Fig - 18
INVENTORS
KARL O. LANGE
WILLIAM K. MASSIE
BY
W. E. Sherwood
attorney United States Patent Office 2,937,642

Patented May 24, 1960

2,937,642

FRACTURE NAIL

Karl O. Lange and William K. Massie, Lexington, Ky., assignors to Lange Instrument Company, Lexington, Ky., a corporation of Kentucky Filed Feb. 17, 1956, Ser. No. 566,187

15 Claims. (Cl. 128—92)

This invention relates to a new and improved device for treating fractured bones and has particular application to the method employed by surgeons in fixing intracapsular fractures of the hip. More specifically, the invention relates to a sliding nail structure which is capable of being placed at the mechanically optimum axis for internal fixation of the fractured bone fragments, although it may be employed advantageously, as well, at the more conventional axes of placement.

Prior investigators in this field have reported upon the three-dimensional force vectors applied to the hip and have shown that, in order to maintain reduction and immobilization of the fractured bone, the static and dynamic forces exerted in the frontal plane are of primary importance. Inman (1947) for example, determined both by theoretical computation and by experimental investigation that the medial trabeculations of the femur indicate the direction of the reacting force exerted through the hip in the frontal plane, irrespective of the position of the pelvis. Preferred fixation, therefore, implies a telescoping nail assembly inserted parallel to the medial trabeculations at an angle of about 155° with the femoral shaft, such a nail being in lateral view mounted along the mid line or slightly posterior position. Since a nail assembly of fixed length may either protrude into the acetabulum, if fixed at its mounting end, or may back out if not so fixed, upon impaction or femur neck shortening, a sliding or telescoping nail assembly is desirable.

While a nail positioned at the optimum axis will normally be subjected almost entirely to compression forces, it is probable that gravity will force the device outwardly sufficiently to loosen its hold on the proximal bone fragment, unless it is retained in position by attachment to the femoral shaft. Our invention includes such an attachment by providing a relatively short, thin, separate element to which the nail structure is attached at an appropriate phase of the installation operation. Heretofore, many varieties of hip nails have been developed in which the attaching element is rigidly affixed to the nail structure prior to insertion into the bone, with the result that longer incisions are required in order to fix the device at an angle such as herein described.

Moreover, as will later appear, the more that the angle of fixation diminishes from the optimum angle, the greater will be the bending moment on the apparatus and the greater will be the required bolting action upon the femoral shaft, thus requiring a longer retaining element and a longer incision, as well as greater stresses on the apparatus and on the femoral shaft.

A prime object of our invention is to provide a new and improved device for treating fractured hip bones and which may be positioned along an optimum axis within the bone.

A second object is to provide an improved device including a separate retaining element, a separate nail supporting member, and a separate nail, all adapted for assembly into a unitary apparatus.

A third object is to provide an improved device requiring a small amount of incision, as contrasted to prior practices.

A fourth object is to provide an improved device requiring a small amount of fastening to the femoral shaft, as compared with prior practices.

Another object is to provide an improved device adapted to serve optionally as a guide for insertion of exploratory wires, pins, or the like.

A further object is to provide an improved device permitting controlled fixation of one bone engaging portion with a second bone engaging portion while preventing relative rotation therebetween.

A further object is to provide an improved device having a substantially constant frictional engagement of one portion with a second portion and permitting sliding movement therebetween.

Still another object is to provide an improved device in which one portion is detachably engaged with a second portion in a manner to permit both portions to be withdrawn or inserted as a unit.

A further object is to provide an improved device permitting impaction of one bone fragment into the other bone fragment along the physiological weight bearing axis by virtue of the telescoping nature of the device and its fixation to the side of the femoral shaft.

A further object is to provide an improved device which presents minimal protrusion beneath the tissues of the thigh laterally and serves to reduce subsequent trauma and irritation which otherwise might conceivably necessitate later removal.

Other objects and advantages will become more apparent as the description proceeds and when considered in conjunction with the accompanying drawings in which:

Fig. 1 is a schematic view of a portion of the body and indicating a general analysis of forces acting thereon in the frontal plane.

Fig. 1*a* is a diagrammatic view indicating a general analysis of forces acting on the body when a fixation member is mounted on an axis with an angle of less than the optimum angle, the axis of the femoral shaft being indicated by line *y*—*y*.

Fig. 2 is a schematic view showing the employment of the improved device for exploration prior to being mounted in position.

Fig. 3 is a schematic view showing the device in position at the conclusion of the installation operation.

Fig. 4 is top plan view of the nail supporting member.

Fig. 5 is a side elevation view, partly in section, of the nail supporting member taken along line 5—5 of Fig. 4.

Fig. 6 is an end view of the nail supporting member.

Fig. 7 is a plan view of the bone fastening nail, drawn to a larger scale, but adapted for mounting within the nail supporting member of Figs. 4 to 6.

Figs. 8 to 10 are sectional views taken along lines 8—8 to 10—10, respectively, of Fig. 7.

Fig. 11 is an end view of the bone fastening nail.

Fig. 12 is a side view of a suitable nail adjusting inserter.

Fig. 13 is a side view of an impacter for engaging with the exposed portions of the device and for driving the same longitudinally along the selected axis.

Fig. 14 is a plan view of the retaining element and Figs. 15 to 18 are sectional views taken along lines 15—15 to 18—18, respectively, of Fig. 14.

Considering first the schematic view of Fig. 1, it will be noted that the forces in the frontal plane may be classified as: a force W acting downwardly through the enter of gravity of the body onto the pelvis; slanting forces T and $T^1$ caused by muscular means, such that a downward force T is exerted on the pelvis and an accompanying upward force $T^1$ is exerted on the trochanter; and a resulting force F acting downwardly through the center of the femoral head at a constant angle $\theta$ with the femoral shaft, this force being resisted by an equal and opposite equilibrant force $F^1$. (The reaction to the force W occurs vertically under the center of gravity at the ankle, and is not shown.) Since a fracture treating means inserted at angle $\theta$ with respect to the axis of the femoral shaft would insure impacting of the bone fragments along fracture section 10, we have provided an apparatus whereby this may be done in a large number of hip fractures. However, it will be understood that in a certain number of injuries the fracture 10 will be found to be at such an angle that a less effective mounting of our nail may be indicated. In such instances, the surgeon may also be able to employ certain advantageous features of our device, although the nail must be mounted at an angle represented by $\alpha$, Fig. 1*a*. Mounting of the nail at this angle, which is the more conventional angle now employed by surgeons, and which is substantially less than angle $\theta$, resolves the forces F and $F^2$ into components parallel and vertical to the nail. While it is apparent that the force components $F_p$ and $F_{2p}$ cause compression of the device, it will also be apparent that the force couple formed by force components $F_v$ and $F_{2v}$ and the distance between them, represents an undesirable bending moment tending to permit transverse slippage of one bone fragment with respect to the other fragment. To overcome this couple the device may be made capable of resisting bending through attachment of a longer retaining means to the femoral shaft, but this in turn necessitates a longer incision and more bolting to the femoral shaft.

In some cases, to avoid using the less desirable angle of fixation the method advocated by McElvenny may be used, wherein the medial lip of the neck fragment may be deliberately displaced medial to the head fragment in order to assure a stable valgus position.

Furthermore, in cases of fractures of the Pauwel type III, the optimum axis at angle $\theta$ provides a minimum of bending moment on the device. In such cases the insertion of the device at that optimum angle is indicated even though a somewhat longer retaining means is desirable to offset whatever bending may tend to occur.

Since the optimum angle $\theta$ has been found to be about 155°, the exploratory wires or pins 11, Fig. 2, should be emplaced in the bone sections at this angle provided the particular fracture section 10 permits. In so emplacing the wires, the device of the invention may be employed as a drill guide, as will be noted from the following description of the several parts of our device.

As shown in Figs. 4 to 6, there is provided an improved nail supporting member 12, having a longitudinal bore 13 therethrough. This member may have any appropriate configuration of its outer surface and is not necessarily round, as shown. For example, in the region wherein it is to engage the bone fragment, it may have a configuration which assists in preventing angular displacement with respect to the bone fragment, such as a scalloped shape or a shape having plane surfaces. Adjacent one end this member is formed with spaced slots 14 and 15 cut into the sides of the member at an angle with respect to the axis of the member. In addition, the one end of the member terminates in an inclined surface 16 which is parallel to the slots. Adjacent its other end, the hollow member is provided with a key or abutment 17 extending into the bore and rigidly fixed to the side of the member. Also adjacent the same end, the nail supporting member is provided with means for frictionally engaging the nail when in position therein. This means may take various forms without departing from the intent of our invention, but we prefer to use an interiorly extending integral portion of the wall of the member for this purpose. A key cutter may be passed along the longitudinal axis of the member during manufacture to produce a thin section 18 after which two slits 19 and 20 may be formed, permitting the thin section 18 to be sprung inwardly. Various degrees of spring pressure may be selected merely by employing known methods of manufacture. In general, we prefer a friction of about 16 ounces and which is uniformly applied at all times.

The value of this friction may, however, be modified, after manufacture of a particular device, merely by pressing an object against one side or the other of the thin section 18 to modify the spring condition thereof. However, in any case, the thin section retains the adjustment given thereto and thus is capable of exerting a substantially constant value of friction upon an engaging element.

Although various forms of nails may be employed, we prefer a modified "Smith-Peterson" type shown in larger scale in Figs. 1 to 11, and having special mounting features. This nail terminates in a plurality (usually three) of fins, 21, 22, 23, having a wide angle therebetween to permit the nail to be moved into the position shown in Fig. 3, such position permitting the nail to pass adjacent to, but without engaging the hard bone in the vicinity of the region marked *r*. A rod-like portion 24 having a longitudinal bore 25 therein supports the fins at one end and at the opposite end terminates in an interiorly threaded cylinder 26 the outer surface of which is provided with a longitudinal keyway 27. Angularly displaced with respect to keyway 27 is a second and longer keyway 28 extending longitudinally of the rod-like nail member. Between the confronting ends of these keyways, a wide groove 29 is cut circumferentially of the nail.

Considering now the sectional views of Figs. 8 to 10, the assembly or disassembly of the nail and nail supporting member may be readily noted. The cylindrical end 26 of rod 24 is moved into the end of member 12 with slot 27 of the rod coinciding with the key 17 inside the supporting member and thereafter the parts are telescoped until the groove 29 encompasses the key 17. At about the same time, the cylindrical end of rod 24 now comes into engagement with the obstructing resilient section 18 and further telescoping must overcome the frictional engagement of these parts. As key 17 enters the groove 29 the rod 24 is rotated with respect to the supporting member bringing slot 28 into line with key 17. Thereafter, the nail portion may be telescoped or extended with respect to the supporting member but is at all times locked against relative rotational movement and subject to frictional engagement in relative longitudinal movement. Accordingly, both parts may be inserted into or withdrawn from a bone as a unit and with assurance that the fins of the nail are maintaining an invariable angular position with respect to the axis of the supporting member and to the plane of the mounting end 16 of that member.

As a means for mounting the device upon the femoral shaft in order to retain the nail and its supporting member in functional position, we employ a simple thin plate element 30 as shown in Figs. 14 to 18. Preferably, the two sides 31 and 32 are parallel but may have a symmetrical concave form, if desired. An elongated aperture 33 as well as a plurality of countersunk bolt or screw receiving holes or slits 34, 35 are formed on side 32 while side 31 comprises a slot or recess 36 having undercut keyways 37 and 38 and projecting keys 39 and 40 extending for a substantial length of the retaining member. The size of said keyways is designed to accommodate the section lying between end 16 and parallel slots 14 and 15 at the end of the nail supporting member while the size of keys 39 and 40 is designed to fit into the slots 14 and 15 of that member.

Depending upon the angle of the end and the slots of the nail supporting member, the retaining plate 30 can mount the nail at that same angle, which we prefer to be about 155°. If, however, a different nail supporting member having some other angle has to be mounted, the same plate 30 may be used with that different member. Since the slots and keyways thus described are along plane surfaces, it is one feature of our invention that the nail supporting member with the nail telescoped therein can be inverted and temporarily installed in the plate at an acute supplementary angle with respect to the angle at which it will later be inserted into the bone.

After so assembling the separable parts, the plate may then be laid against the exposed femur shaft with the side 32 of the plate contacting the shaft and thus the apparatus may conveniently serve as a drill guide means for exploratory work. As seen in Fig. 2, a drill chuck 60 holding a long drill rod 61 may drill one or more apertures within the intracapsular region and into which apertures guide wires or pins 11 may be temporarily installed for X-ray work.

Following this use of the device the nail supporting member and nail are removed from plate 30 and after a larger aperture has been formed in the femur shaft along the axis of the selected guide wire 11 these members are inserted as a unit into the bone with the selected guide wire being encompassed by the bore 25 in the nail and the bore 13 in the supporting member.

We prefer to accomplish this insertion in the following manner: A separate inserter tool 42 (Fig. 12) having screw threads 43 at one end is engaged with the threaded cylinder end 26 of the nail while that nail is assembled within the nail supporting member 12. The assembly is thus pushed into the fractured bone fragments with the nail being telescoped out as far as the inserter will permit, it being understood that the length of such inserter is such that the slot 28 of the nail is still engaged with key 17 when the inserter is fully confined within the nail supporting member 12.

During this step of insertion the forward end of the nail is brought into close proximity to the cortex of the distal fragment of the fractured bone, as dictated by X-ray analysis, after which the inserter 42 is disengaged and removed, as is the guide wire 11. At this time, the plate 30 is then engaged in the slots 14 and 15 of the exposed end of member 12, it being noted that a remarkably short incision is needed for this purpose (in some cases, as little as 4 inches of the femoral shaft has been required to be exposed).

Thereafter, by means of a conventional impacter 50 having a surface 51 disposed at a suitable angle to the surface 32 of plate 30 (which corresponds to the angle at which the nail supporting member is fixed to the same plate), the plate is firmly driven against the femur shaft and is affixed thereto by suitable means such as screws not shown, passing into the recessed apertures 34 and 35. After the fixing of the screws in place, the fracture is impacted by repeated hammer blows on the end of the impactor 50 and this impacting force takes place, in the preferred usage of our invention, along the physiological weight bearing axis. A projecting driver guide 52 adapted for engagement with the hollow end 13 of the nail supporting member assists in the mounting of the device during the driving and compacting phase.

While the several parts of our device may be made of any suitable material having the necessary compatibility with the human body and the necessary mechanical strength, we prefer to use stainless steel, cobalt alloys, titanium or titanium alloys. Such parts may be machined, cast, pressed or formed in any other conventional manner with suitably smooth surfaces. It will be noted that the outer end of the member 12 is enclosed within the thin plate 30 and that a comparatively smooth and compact protrusion is thus embedded beneath the tissues of the thigh. Accordingly, the trauma and irritation which might otherwise be possible with large or irregularly shaped protrusions is greatly reduced.

Although this invention has been described with reference to particular embodiments thereof, it is to be understood that numerous modifications may be made by those skilled in the art without actually departing from the invention. It is, therefore, the purpose of the appended claims to cover all such equivalent variations as come within the true spirit and scope of the foregoing disclosure.

What we claim as new and desire to secure by Letters Patent of the United States is:

1. A device for treating fractured bones, including a separate nail supporting member for mounting within a first portion of the fractured bone and having an outer end including an abutting surface at an angle to the longitudinal axis of said member, a nail mounted on said member for longitudinal movement therealong and having a means at one end for engaging with a second portion of the fractured bone beyond the fractured section thereof and a means adjacent the second end for engaging with said member and for assembling said nail and said member as a unit, and a retaining means comprising a separate element engageable at a fixed angle with said nail supporting member adjacent said outer end thereof and adapted for mounting upon the first portion of said fractured bone and for preventing axial movement of said nail supporting member, said retaining means having a surface against which said abutting surface of said member engages.

2. A device for treating fractured bones, including a separate nail supporting member for mounting within a first portion of the fractured bone and having an outer end including an abutting surface at an angle to the longitudinal axis of said member, a nail mounted on said member for longitudinal movement therealong and having means at one end for engaging with a second portion of the fractured bone beyond the fractured section thereof and a means adjacent the second end for engaging with said member and for assembling said nail and said member as a unit, and a retaining means comprising a separate element engageable at a fixed angle with said nail supporting member adjacent said outer end thereof and adapted for mounting upon the first portion of said fractured bone and for preventing axial movement of said nail supporting member, said retaining means having a surface against which said abutting surface of said member engages, said member and nail having a cross-sectional configuration permitting the same to be installed within the bone by movement along a previously emplaced guiding means.

3. Apparatus as defined in claim 2 wherein said supporting member comprises a hollow bushing and said nail comprises a hollow rod, said rod being adapted for longitudinal movement in said bushing to provide a telescoping assembly.

4. Apparatus as defined in claim 3, wherein said rod and bushing are frictionally engaged while in assembled position.

5. A device for treating fractured bones, including a separate nail supporting member for mounting within a first portion of the fractured bone and having an outer end including an abutting surface at an angle to the longitudinal axis of said member, a nail mounted on said member for longitudinal movement therealong and having means at one end for engaging with a second portion of the fractured bone beyond the fractured section thereof, means for restraining said nail against angular displacement with respect to said member following assembly of said nail and member, and a retaining means comprising a separate element engageable at a fixed angle with said nail supporting member adjacent said outer end thereof and adapted for mounting upon the first portion of said fractured bone and for preventing axial movement of said nail supporting member, said retaining means having a surface against which said abutting surface of said member engages, said member and nail having a cross-sectional configuration permitting the same to be installed within the bone by movement along a previously emplaced guiding means and with the bone engaging means at the end of the nail being restrained from angular displacement during said movement along said guiding means.

6. In a device for treating fractured bones comprising a nail supporting member and a nail mounted on said member for longitudinal movement with respect thereto and having a plurality of laterally projecting fins adjacent one end for bone penetration by driving action thereof into said bone, the improvement comprising means for detachably joining said member and nail whereby the device may be inserted or removed as a unit into or from a bone installation with said fins in predetermined alignment with said bone, and including a means for selectively engaging said member and said nail at a first relative angular position thereof and at a second relative angular position thereof, said member and nail being separable while in said first angular position and being inseparable while in said second angular position.

7. Apparatus as defined in claim 6, wherein said means includes a first keyway and a key engageable with each other in said first angular position and a second keyway and said key engageable with each other in said second angular position, the first and second keyways being parallel to each other and being angularly spaced from each other.

8. Apparatus as defined in claim 7, wherein said keyways are located in said nail and said key is located in said nail supporting member.

9. In a device for treating fractured bones comprising, a nail supporting member having adjacent its outer end an abutting surface at an angle to the longitudinal axis of said member, a nail mounted on said member and a separate retaining means for mounting the device upon a femoral shaft, the improvement comprising an arrangement wherein said retaining means has a first side adapted to fit closely adjacent the surface of the femoral shaft, a second side adapted to contact tissues of the thigh and a recess between said first and second sides within which the end of said nail supporting member is enclosed in abutting relation thereto, thereby to present a minimal protrusion beneath said tissues while preventing longitudinal movement of said nail supporting member into said tissues.

10. Apparatus as defined in claim 9 wherein said nail supporting member is provided with spaced slots adjacent one end and said retaining means recess includes spaced key members adapted to engage said slots.

11. Apparatus as defined in claim 9 wherein the abutting surface of said nail supporting member comprises a flat end surface adapted to engage in said abutting relation an inner surface of said recess within said retaining means.

12. In a hip fracture nail device, the combination of: a separate hollow, elongated, nail supporting member for mounting within a first portion of a fractured bone, an elongated nail having a plurality of laterally projecting fins adjacent one end for bone penetration by driving action into a second portion of said bone, said nail having a means adjacent its second end for engaging interiorly with said member and joining said nail and said member as a unit in telescoping relation to each other, and a retaining means comprising a separate element removably engageable with said member adjacent the outer end thereof and forming an abutment preventing longitudinal movement of said member relative to said retaining means, said retaining means being engageable with said member at a fixed angle with respect to the longitudinal axis thereof and adapted for mounting upon said first portion of said bone.

13. The device of claim 12 wherein said fixed angle is about 155° measured downwardly from the axis of said member.

14. The device of claim 12 including means carried by said member and contacting said nail intermediate its ends for frictionally resisting longitudinal movement of said nail with respect to said member.

15. The device of claim 14 wherein said means carried by said member forms an integral part of said member.

References Cited in the file of this patent

UNITED STATES PATENTS

| | | |
|---|---|---|
| 2,200,120 | Nauth | May 7, 1940 |
| 2,267,925 | Johnson | Dec. 30, 1941 |
| 2,397,545 | Hardinge | Apr. 2, 1946 |
| 2,557,669 | Lloyd | June 19, 1951 |
| 2,627,855 | Price | Feb. 10, 1953 |
| 2,699,774 | Livingston | Jan. 18, 1955 |
| 2,702,543 | Pugh et al. | Feb. 22, 1955 |
| 2,725,053 | Bambara et al. | Nov. 29, 1955 |
| 2,761,444 | Luck | Sept. 4, 1956 |

OTHER REFERENCES

"Fracture Appliances," 1954, De Puy Mfg. Co. Inc. (page 65 relied on). (Copy in Div. 55.)